(12) United States Patent
Dreher et al.

(10) Patent No.: US 7,695,134 B2
(45) Date of Patent: Apr. 13, 2010

(54) APPARATUS AND METHOD OF CORRECTING HIGHER-ORDER ABERRATIONS OF THE HUMAN EYE

(75) Inventors: Andreas W. Dreher, Escondido, CA (US); Shui T. Lai, Encinitas, CA (US); Donald G. Bruns, San Diego, CA (US)

(73) Assignee: Ophthonix, Inc., Vista, CA (US)

( * ) Notice: Subject to any disclaimer, the term of this patent is extended or adjusted under 35 U.S.C. 154(b) by 0 days.

(21) Appl. No.: 11/869,607

(22) Filed: Oct. 9, 2007

(65) Prior Publication Data
US 2008/0252845 A1 Oct. 16, 2008

Related U.S. Application Data

(60) Division of application No. 10/218,049, filed on Aug. 12, 2002, now Pat. No. 7,293,871, which is a continuation-in-part of application No. 09/875,447, filed on Jun. 4, 2001, now Pat. No. 6,813,082.

(60) Provisional application No. 60/253,418, filed on Nov. 27, 2000.

(51) Int. Cl.
*G02C 7/04* (2006.01)
*G02C 7/02* (2006.01)
(52) U.S. Cl. .................. 351/160 R; 351/177
(58) Field of Classification Search ............. 351/160 R, 351/160 H, 219
See application file for complete search history.

(56) References Cited

U.S. PATENT DOCUMENTS

| | | | |
|---|---|---|---|
| 3,933,411 A | 1/1976 | Winner | |
| 3,973,837 A | 8/1976 | Page | |
| 4,022,855 A * | 5/1977 | Hamblen | 264/1.38 |
| 4,268,133 A | 5/1981 | Fischer et al. | |
| 4,666,236 A | 5/1987 | Mikami et al. | |
| 4,810,070 A | 3/1989 | Suda et al. | |
| 4,848,894 A | 7/1989 | Buser et al. | |
| 4,869,587 A | 9/1989 | Breger | |
| 4,874,234 A | 10/1989 | Wichterle | |

(Continued)

FOREIGN PATENT DOCUMENTS

EP 0 472 384 8/1991

(Continued)

OTHER PUBLICATIONS

International Search Report for Application No. PCT/US03/24150, dated on Nov. 26, 2003, filed on Jul. 30, 2003.

(Continued)

*Primary Examiner*—Jordan M. Schwartz
(74) *Attorney, Agent, or Firm*—Morrison & Foerster LLP

(57) ABSTRACT

The wavefront aberrator is applicable to correct aberrations of the human eye. In one embodiment, the aberrator device comprises a pair of transparent lenses separated by a layer of curable resin comprising monomers and polymerization initiators. By controlling the extent of its curing, this monomer layer provides an adjustable index of refraction profile across the layer. Curing of the resin may be made by exposure to light, such as ultraviolet light. By controlling the extent of light exposure across the surface of the curable resin, for example, a particular and unique refractive index profile can be produced.

9 Claims, 12 Drawing Sheets

U.S. PATENT DOCUMENTS

| | | | |
|---|---|---|---|
| 4,969,729 A | 11/1990 | Merle | |
| 4,996,123 A | 2/1991 | Nomura et al. | |
| 5,054,888 A | 10/1991 | Jacobs et al. | |
| 5,080,472 A | 1/1992 | Gupta | |
| 5,100,589 A | 3/1992 | Ticknor | |
| 5,114,628 A | 5/1992 | Hofer et al. | |
| 5,116,684 A | 5/1992 | Fretz, Jr. et al. | |
| 5,148,205 A | 9/1992 | Guilino et al. | |
| 5,198,844 A | 3/1993 | Roffman et al. | |
| 5,200,858 A | 4/1993 | Hagerty et al. | |
| 5,223,862 A | 6/1993 | Dasher et al. | |
| 5,229,797 A | 7/1993 | Futhey et al. | |
| 5,266,352 A | 11/1993 | Filas et al. | |
| 5,343,260 A | 8/1994 | Henry et al. | |
| 5,372,755 A | 12/1994 | Stoerr et al. | |
| 5,433,810 A | 7/1995 | Abrams | |
| 5,448,312 A | 9/1995 | Roffman et al. | |
| 5,528,321 A | 6/1996 | Blum et al. | |
| 5,585,968 A | 12/1996 | Guhman et al. | |
| 5,606,378 A | 2/1997 | Van Meurs | |
| 5,608,471 A | 3/1997 | Miller | |
| 5,617,154 A | 4/1997 | Hoffman | |
| 5,650,837 A | 7/1997 | Roffman et al. | |
| 5,715,031 A | 2/1998 | Roffman et al. | |
| 5,771,088 A | 6/1998 | Perrott | |
| 5,777,719 A | 7/1998 | Williams et al. | |
| 5,786,883 A | 7/1998 | Miller et al. | |
| 5,835,192 A | 11/1998 | Roffman et al. | |
| 5,861,934 A | 1/1999 | Blum et al. | |
| 5,864,379 A | 1/1999 | Dunn | |
| 5,872,613 A | 2/1999 | Blum et al. | |
| 5,880,809 A | 3/1999 | Lieberman et al. | |
| 5,907,386 A | 5/1999 | Gupta et al. | |
| 5,929,969 A | 7/1999 | Roffman | |
| 5,949,521 A | 9/1999 | Williams et al. | |
| 5,953,098 A | 9/1999 | Lieberman et al. | |
| 5,956,183 A | 9/1999 | Epstein et al. | |
| 5,998,096 A | 12/1999 | Umemoto et al. | |
| 6,027,672 A | 2/2000 | Weitzel et al. | |
| 6,081,632 A | 6/2000 | Yoshimura et al. | |
| 6,086,204 A | 7/2000 | Magnante | |
| 6,089,711 A | 7/2000 | Blankenbecler et al. | |
| 6,109,749 A | 8/2000 | Bernstein | |
| 6,139,147 A | 10/2000 | Zhang | |
| 6,176,580 B1 | 1/2001 | Roffman et al. | |
| 6,240,226 B1 | 5/2001 | Presby et al. | |
| 6,274,288 B1 | 8/2001 | Kewitsch et al. | |
| 6,319,433 B1 | 11/2001 | Kohan | |
| 6,328,446 B1 | 12/2001 | Bhalakia et al. | |
| 6,379,005 B1 | 4/2002 | Williams et al. | |
| 6,390,623 B1 | 5/2002 | Kokonaski et al. | |
| 6,450,642 B1 | 9/2002 | Jethmalani et al. | |
| 6,499,843 B1 | 12/2002 | Cox et al. | |
| 6,554,425 B1 * | 4/2003 | Roffman et al. | 351/177 |
| 6,712,466 B2 | 3/2004 | Dreher | |
| 6,786,602 B2 | 9/2004 | Abitbol | |
| 2002/0080464 A1 | 6/2002 | Bruns | |
| 2002/0196412 A1 | 12/2002 | Abitbol | |
| 2003/0081172 A1 | 5/2003 | Dreher | |

FOREIGN PATENT DOCUMENTS

| | | |
|---|---|---|
| EP | 0 485 197 | 5/1992 |
| EP | 0 887 687 | 12/1998 |
| EP | 0 949 529 | 4/1999 |
| GB | 1045065 | 10/1966 |
| JP | 57053702 | 3/1982 |
| JP | 59114030 | 6/1984 |
| JP | 60-175009 | 9/1985 |
| WO | WO-86/01308 | 2/1986 |
| WO | WO-89/01640 | 2/1989 |
| WO | WO-94/14567 | 7/1994 |
| WO | WO-98/53360 | 11/1998 |
| WO | WO-99/13361 | 3/1999 |
| WO | WO-99/34239 | 7/1999 |
| WO | WO-99/34248 | 7/1999 |
| WO | WO-00/41650 | 7/2000 |
| WO | WO-01/02896 | 1/2001 |
| WO | WO-01/89424 | 11/2001 |
| WO | WO-02/13728 | 2/2002 |
| WO | WO-02/26121 | 4/2002 |
| WO | WO 02/32297 | 4/2002 |
| WO | WO-03/058296 | 7/2003 |

OTHER PUBLICATIONS

Moretti, "New laser-based technologies incubate," Opthamology News, Nov. 29, 2001.

European Search Report for EP 06020933.5, mailed Jun. 18, 2008, 5 pages.

European Office Action for Application No. 03 808 084.2, dated Jun. 27, 2008, 3 pages.

Notice of Reasons for Rejection for Japanese Patent Application No. 2004-527710, mailed on Sep. 16, 2008, 8 pages.

* cited by examiner

APPARATUS AND METHOD OF CORRECTING HIGHER-ORDER ABERRATIONS OF THE HUMAN EYE

CROSS-REFERENCE TO RELATED APPLICATIONS

This application is a Divisional of U.S. Utility patent application Ser. No. 10/218,049 filed Aug. 12, 2002, which is a Continuation-In-Part of U.S. Utility patent application Ser. No. 09/875,447 filed Jun. 4, 2001 (now U.S. Pat. No. 6,813,082), which claims benefit of U.S. Provisional Application No. 60/253,418 filed Nov. 27, 2000. The contents of these document are incorporated herein by reference.

BACKGROUND OF THE INVENTION

1. Field of the Invention

The present invention relates to an apparatus for correcting aberrations of the human eye, and a method relating to manufacturing the same. More particularly, the invention relates to a wavefront aberrator adapted to be placed on a human eye for correction of higher order aberrations.

2. Description of the Related Art

In traditional optical systems having reflecting and refracting surfaces, it is common to assume that the light passing through the system is limited to paraxial rays, specifically, rays that are near the optical axis and are sustained within small angles. However, practical optical systems rarely are limited to paraxial rays, and thus, the actual images assumed by gaussian optics often depart from the "perfect" image. This departure from the "perfect" image results in the introduction of distortion into the optical system, called aberrations. These aberrations are most problematic in small focal ratio optical systems where the angle from the optical axis is larger.

In a monochromatic optical system with only spherical surfaces, there are five (5) basic ray and wave aberrations, namely, spherical aberrations, coma, astigmatism, curvature of field, and distortion. Optical systems for use with multi-chromatic light have an additional source of distortion, namely, chromatic aberration.

Because the distortion introduced by aberrations into an optical system significantly degrades the quality of the images on the image plane of such system, there are significant advantages to the reduction of those aberrations. Various techniques are often used to minimize the aberrations. For example, in order to minimize spherical aberrations or coma, a lens may be "bent" to have different radii of curvature on opposite sides while maintaining a constant focal length, such as is contemplated by using the Coddington shape factor. Also, a pair of lenses, where one glass lens has a positive focal length, and the other made from a different glass has a negative focal length, are used together to correct spherical aberration. One example of this technique is the "doublet" lens in which the two lenses have the same radius of curvature on the facing sides, and are cemented together.

Despite the available techniques to minimize the various aberrations, it is often difficult to simultaneously minimize all aberrations. In fact, corrections to an optical system to minimize one type of aberration may result in the increase in one of the other aberrations. This is particularly troublesome when analyzing the human eye as an optical system.

The human eye, namely the cornea and lens, can exhibit a variety of aberrations that diminish the optical performance of the eye resulting in blurred vision. Historically, the optical aberrations have been corrected by introducing man made lenses such as spectacle or contact lenses in front of the human vision system. More recently, more permanent corrections have been made by surgical procedures and techniques such as intraocular lens insertion and corneal sculpting such as Radial Keratotomy, Astigmatic Keratotomy, Automated Lamellar Keratoplasty, Photo Refractive Keratectomy, or Laser In Situ Keratomileuis (LASIK).

The correction of blurred vision by lenses has typically been limited to correction of low order aberrations only, such as defocus and astigmatism. Traditionally, higher order aberrations, e.g., those describable with Zernike polynomials of the third order or higher, could not be corrected using lenses. In addition, due to lens manufacturing limitations and expenses, defocus and astigmatism are typically only corrected in discrete steps, with any correction being made to the nearest one quarter (¼) diopter. Unfortunately, the resolution of one quarter (¼) diopter results in incomplete vision corrections and limits the performance of the patients eye. An advantage of man-made lenses is that any continuing degradation in eye performance can be compensated with by a new lens derived from a current optical examination.

Surgical procedures and techniques provide a more permanent vision correction than non-surgical approaches. Intraocular lenses are man-made lenses that are surgically inserted to replace the defective lens. Corneal sculpting entails various surgical procedures for the modification and alteration of the cornea. The advantage of surgical procedures is that they provide the opportunity for finer resolution corrections. However, any shift in the optical performance of the eye due to aging or trauma requires additional surgeries for corrections or the addition of man-made lenses. Also inherent in all surgical procedures is the risk of infection and permanent damage causing a further degradation in vision.

Consequently, a need exists for an optical element that will precisely compensate for optical aberrations, in addition to defocus and astigmatism, in human vision. This optical element must be easily replaceable as eye performance degrades with age or other defects. Thus, the optical correcting device must be incorporated into the human vision system in a non-invasive and repeatable manner.

SUMMARY OF THE INVENTION

In one embodiment, the wavefront aberrator includes a pair of transparent windows, or plates, separated by a layer of monomers and polymerization initiators, such as a radiation curable resin. Various radiation curable resins are known to those skilled in the art. Preferred radiation curable resins exhibit a variable index of refraction as a function of the extent of curing, wherein the curing is induced by exposure to ultraviolet, visible, or infrared radiation. Preferably, curing of the radiation curable resin is made by exposure to ultraviolet light. The exposure to light may be varied across the surface of the radiation curable resin to create a particular and unique wavefront retardation profile such that when an ideal plane wave passes through the wavefront aberrator, a predetermined change of the wavefront profile can be affected by the wavefront aberrator. Conversely, if a distorted wavefront is known, such as by measuring the wavefront with a Hartmann/Shack sensor, a correction of such aberrated or distorted wavefront aberration may be achieved by first producing a complementary wavefront aberrator device such that if the abnormal wavefront passes through the wavefront aberrator device, a corrected plane wave emerges.

One method of creating the wavefront aberrator of the present invention includes the exposure of the radiation curable resin to an array of light emitting diodes (LEDs). These LEDs may be selectively illuminated such that different regions of the radiation curable resin are exposed to different levels of illumination. This variance in illumination results in the creation of a wavefront aberrator having a varying index of refraction across its surface, and may include the formation of multiple sub-regions, where the index of refraction of the cured radiation curable resin in a sub-region has a constant index of refraction, with the index of refraction varying between adjacent sub-regions.

An alternative method of creating the wavefront aberrator of the present invention includes the exposure of the radiation curable resin to an array of LEDs through a demagnifier lens. In this manner, the LEDs may create a curing pattern which is then focused onto the surface of the radiation curable resin to create a similar, yet smaller, version of the curing pattern to provide for reduced-sized wavefront aberrators.

Yet another alternative method of creating the wavefront aberrator of the present invention includes the creation of a curing pattern by the transmission of light through a liquid crystal display (LCD). A non-coherent light source may be positioned adjacent to a diffuser to create a diffused light source. This diffused light may then be transmitted through a LCD containing a curing pattern, and onto a wavefront aberrator. As the radiation curable resin is exposed, the curing pattern on the LCD creates the desired refractive index profile. New patterns may be generated by changing the pattern on the LCD.

A sensor may be placed beneath the wavefront aberrator to monitor the transmitted image of the curing pattern. The output of this sensor may be used to actively modulate the transmission of light through the LCD to create a wavefront aberrator having a desired refractive index profile, and to provide for an active monitor and control of the curing of each sub-region of the wavefront aberrator.

Another alternative method of creating the wavefront aberrator of the present invention includes the creation of a curing pattern by the selective illumination of regions of the radiation curable resin using a point light source, such as a laser. This selective illumination may be accomplished by rastering a region of the surface of the radiation curable resin, varying the speed and/or intensity of the light source to vary the curing of the radiation curable resin. Alternatively, the light source may trace particular curing patterns directly onto the wavefront aberrator at various speeds and/or intensities of light, such as by raster or vector scanning the curing pattern onto the aberrator. Also, a positive or negative, or "contact print," containing a particular wavefront retardation design may be positioned adjacent the wavefront aberrator and exposed to a diffused or collimated light to create the desired refractive index profile.

An alternative embodiment provides for the correction of astigmatism and defocus in human vision that are induced by aberrations in the human eye by the cornea and lens. For example, if aberrations, or distortion in a human eye are known to create a distorted wave front, a correction of such aberrated or distorted wave front may be achieved by producing a complementary Wavefront Aberrator device such that passing the abnormal wave front through the Wavefront Aberrator device, a plane wave emerges. By placing the Wavefront Aberrator device on the surface, or cornea, of the eye, a higher degree of vision correction may be realized.

In another embodiment, the Wavefront Aberrator includes a pair of transparent windows, or plates, separated by a layer of monomers and polymerization initiators, such as a radiation curable resin (e.g., an epoxy). This radiation curable resin exhibits an index of refraction which varies as a function of the extent of its curing. Curing the radiation curable resin may be made by exposure to light such as ultraviolet light. The exposure to the light may be varied across the surface of the radiation curable resin to create a particular and unique wavefront retardation profile such that when an ideal plane wave passes through the Wavefront Aberrator, a predetermined change of the wave front profile can be effected by the Wavefront Aberrator device.

These and other objects and features of the present invention will become more fully apparent from the following description and appended claims taken in conjunction with the following drawings, where like reference numbers indicate identical or functionally similar elements.

DETAILED DESCRIPTION OF THE PREFERRED EMBODIMENT

In the following description, reference is made to the accompanying drawings, which form a part hereof, and which show, by way of illustration, specific examples or processes in which the invention may be practiced. Where possible, the same reference numbers are used throughout the drawings to refer to the same or like components. In some instances, numerous specific details are set forth in order to provide a thorough understanding of the invention. The invention, however, may be practiced without the specific details or with certain alternative equivalent devices and/or components and methods to those described herein. In other instances, well-known methods and devices and/or components have not been described in detail so as not to unnecessarily obscure aspects of the invention.

As used herein, the term "epoxy" denotes various curable monomers and pre-polymers, as well as resins that can be polymerized by the application of light, heat, or any other curing initiating methods known in the art, and is therefore not limited to the members of the epoxy family. A "radiation curable resin," as that term in used herein, refers to a monomer, pre-polymer, polymer and/or mixture thereof that polymerizes and/or crosslinks upon exposure to radiation, preferably ultraviolet radiation.

Figure 1:
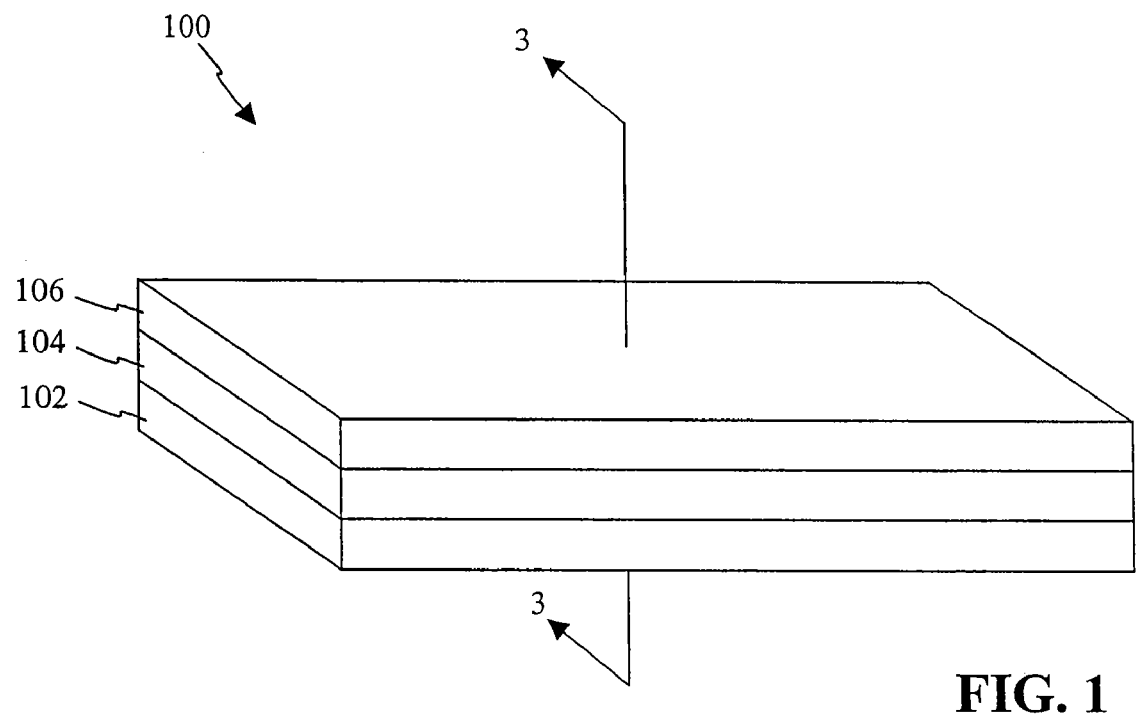
FIG. 1 is diagram illustrating a perspective view of a wavefront aberrator including a layer of radiation curable resin sandwiched between an upper transparent cover and a lower transparent cover.

Referring initially to FIG. 1, a diagram illustrating a perspective view of one embodiment of the wavefront aberrator is shown and generally designated 100. Aberrator 100 includes a lower transparent cover 102, a radiation curable resin layer 104, and an upper transparent cover 106.

The shape of aberrator 100 is shown in FIG. 1 having square covers 102 and 106. It is to be appreciated, however, that the shape of the aberrator 100 shown in FIG. 1 is merely exemplary, and that any shape may be used. Also, for purposes of illustration, the transparent covers 102 and 106 are shown in FIG. 1 as being substantially planar. However, it is to be appreciated that the covers 102 and 106 may be curved to provide a non-planar aberrator 100. In addition, those of skill in the art will recognize that an aberrator may comprise only a radiation curable resin layer, without the need for the upper and lower transparent covers 106 and 102.

Figure 2:
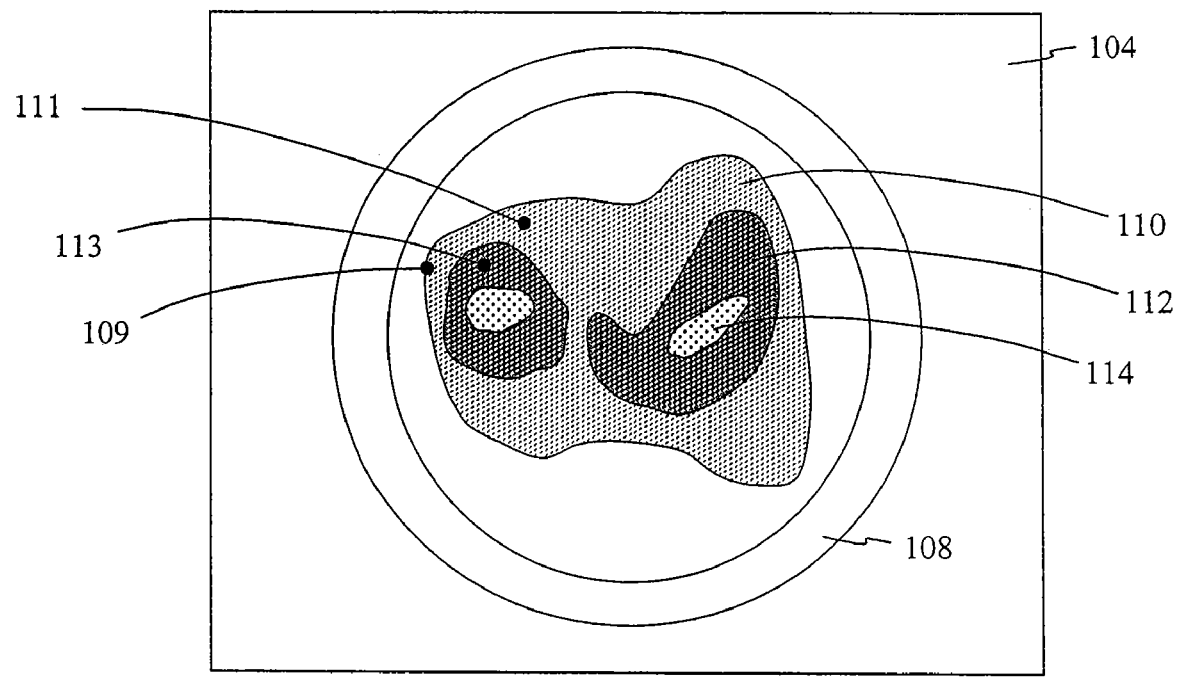
FIG. 2 is a diagram illustrating a top view of the wavefront aberrator including a circular barrier surrounding the radiation curable resin layer and confining the radiation curable resin within a predetermined volume, the radiation curable resin layer formed within the circular barrier and having a variety of refractive index profiles between different sub-regions.

Referring to FIG. 2, a diagram illustrating a top view of the wavefront aberrator 100 is shown. A barrier, such as circular barrier 108, may be positioned surrounding radiation curable resin layer 104 to retain the placement of the radiation curable resin 104 between upper transparent cover 106 and lower transparent cover 102. Those of skill in the art will recognize that the radiation curable resin may be shaped for placement directly on the eye, without the need for the upper and lower transparent covers 106 and 102.

Radiation curable resin 104 is, in a preferred embodiment, a light-curable resin comprised of monomers and polymerization initiators. The refractive index of the resin changes as the resin is cured, and it varies between locations within the resin layer depending on the extent of curing of the radiation curable resin. The extent of curing is determined by the percentage of cross-linking between the monomers within the radiation curable resin. Suitable resins include VLE-4101 UV-Visible Light Cure Epoxy, available from Star Technology, Inc., or Optical Adhesive #63, U.V. Curing, available from Norland Products, Inc. Typically, these resins are curable by exposure to UV or visible light radiation in the range of 300 to 550 nanometers (300-550 nm). Generally, the concepts described herein apply to any type of radiation curable resin that exhibits an index of refraction change upon curing and the corresponding curing light source may have wavelengths ranging between 300 nm and 3000 nm It is to be appreciated that many other suitable radiation curable resins exist which exhibit a similar change in index of refraction upon exposure to light. Other monomers that polymerize into long-chain molecules using photo-initiators may also be used. For example, a suitable monomer may be chosen from the family of epoxides, urethanes, thiolenes, acrylates, cellulose esters, or mercapto-esters, and a broad class of epoxies. Also, for example, a suitable photo-initiator may be chosen from alpha cleavage photo-initiators such as the benzoin ethers, benzyl ketals, acetophenones, or phosphine oxides, or hydrogen abstraction photo-initiators such as the benzophenones, thioxanthones, camphorquinones, or bisimidazole, or cationic photo-initiators such as the aryldiazonium salts, arylsulfonium and aryliodonium salts, or ferrocenium salts. Alternatively, other photo-initiators such as the phenylphosphonium benzophene salts, aryl tert-butyl peresters, titanocene, or NMM may be used.

The term "radiation curable resin" also refers to polymers having a refractive index that can be altered by exposure to radiation. Liquid crystal polymers are comprised of mesogenic units that can be preferentially oriented by various methods, including by mechanical processing or by the application of an electromagnetic field. See, e.g., A. Ciferri, et al., "Polymer Liquid Crystals," Academic Press, New York, 1982; and U.S. Pat. Nos. 5,319,113 and 5,237,076. The refractive index is preferably controlled by controlling the orientation of the mesogenic units, and thus in preferred embodiments chemical reactions involving polymerization initiators are unnecessary. A variety of liquid crystal polymers are know to those skilled in the art in which the mesogenic units are in the polymer backbone and/or in a side chain. Side chain liquid crystal polymers are preferred.

In one embodiment, a light source containing a particular wavelength irradiates the monomer layer which activates the photo-initiator and begins the curing process within the radiation curable resin. Curing of liquid crystal polymers is preferably conducted by heating to increase the mobility of the mesogenic units, then applying an electromagnetic field to orient the mesogens. The curing process results in a corresponding change of the index of refraction within the resin. However, it is also to be appreciated that terminating the exposure to the particular wavelength of light ceases the curing of the radiation curable resin, and ceases the change of the index of refraction exhibited by the radiation curable resin. In this manner, an aberrator 100 may be formed by exposing certain regions of the radiation curable resin 104 to a light source which varies with time and position, resulting in an aberrator having a varied index of refraction across its surface. The selectively cured aberrator may be in the form of a lens or lens element to be placed in front of an eye, e.g., in the manner of an eyeglass. Preferably, the selectively cured aberrator is shaped for placement on an eye. Placement of the aberrator in front of or onto the eye preferably corrects lower order and/or higher order aberrations. In one embodiment, a contact lens comprises the cured radiation curable resin. In another embodiment, a contact lens comprises the cured radiation curable resin adhered to one or more lenses. In another embodiment, an eyeglass lens comprises a liquid crystal polymer.

In FIG. 2, a variety of refractive index profiles are shown to be formed in a radiation curable resin layer 104. More specifically, different refractive index profiles are illustrated by regions 110, 112, and 114, such that aberrator 100 includes three (3) distinct levels of refractive index.

It is to be appreciated that the incorporation of three (3) different levels of refractive index in FIG. 2 is merely exemplary. One of skill in the art will recognize that the concepts described herein may be applied to a system comprising any number of refractive index profiles, and that those different profiles may be formed within radiation curable resin layer 104 to have virtually any shape or local curvature. Moreover, the radiation curable resin layer 104 may be considered to be an array of pixels, such as pixels 109, 111, 113, which may each be selectively illuminated and cured to exhibit a particular index of refraction.

Figure 3:
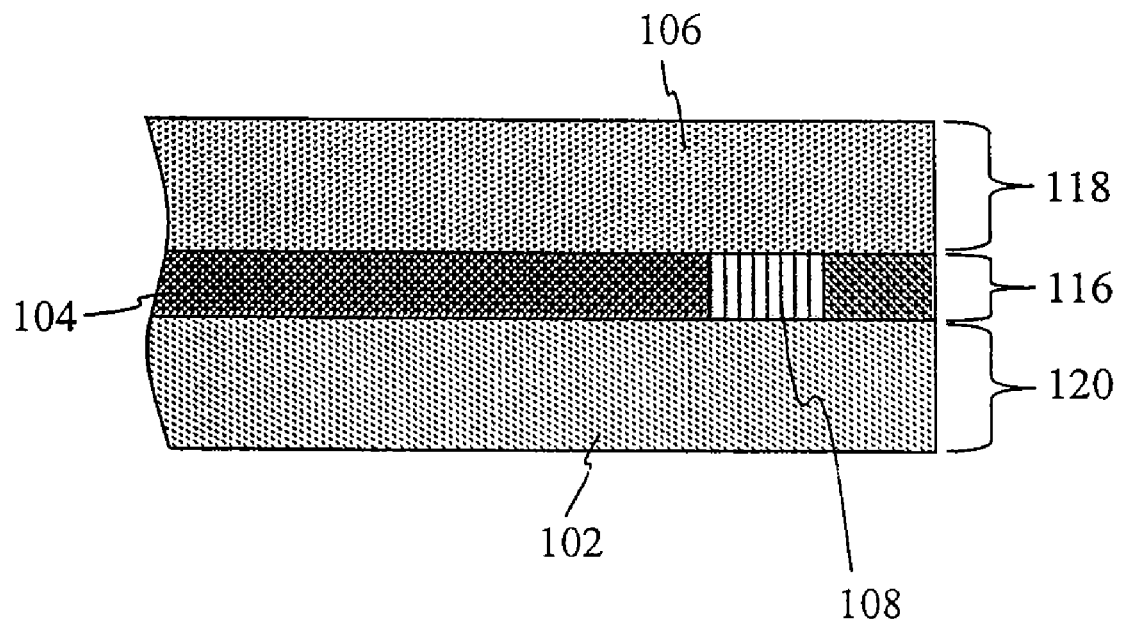
FIG. 3 is a diagram illustrating a cross-sectional view of the wavefront aberrator taken along line 3-3 of FIG. 1, and showing the positioning of the radiation curable resin layer between the upper and lower transparent covers.

Referring now to FIG. 3, a diagram illustrating a cross-sectional view of the wavefront aberrator taken along line 3-3 of FIG. 1 is shown. Radiation curable resin layer 104 is sandwiched between upper transparent cover 106 and lower transparent cover 102, and held in place by barrier 108. The enclosed volume of radiation curable resin layer 104 is determined by the size of barrier 108, and the distance between upper transparent cover 106 and lower transparent cover 102. In a preferred embodiment, radiation curable resin layer 104 has a thickness 116 in the range of approximately 0.002 to 0.1 inches 0.0508 to 2.54 mm); upper transparent cover 106 has a thickness 118 in the range of approximately 0.02 to 0.1 inches (0.508 to 2.54 mm); and lower transparent cover 102 has a thickness 120 in the range of approximately 0.02 to 0.1 inches (0.0508 to 2.54 mm).

In a preferred embodiment, upper transparent cover 106 and lower transparent cover 104 are formed from a rigid transparent material, such as glass or plastic. While glass provides a stable platform for the formation of the refractive index profile, such rigidity is not necessary. In fact, covers 102 and 106 may be made from a flexible material, such as a transparent polymer. A suitable transparent polymer may include, but not be limited to, Mylar® film, polycarbonate film, or acetate film. Use of such materials results in a flexible aberrator having a distinct refractive index profile.

Methods of Manufacturing

Figure 4:
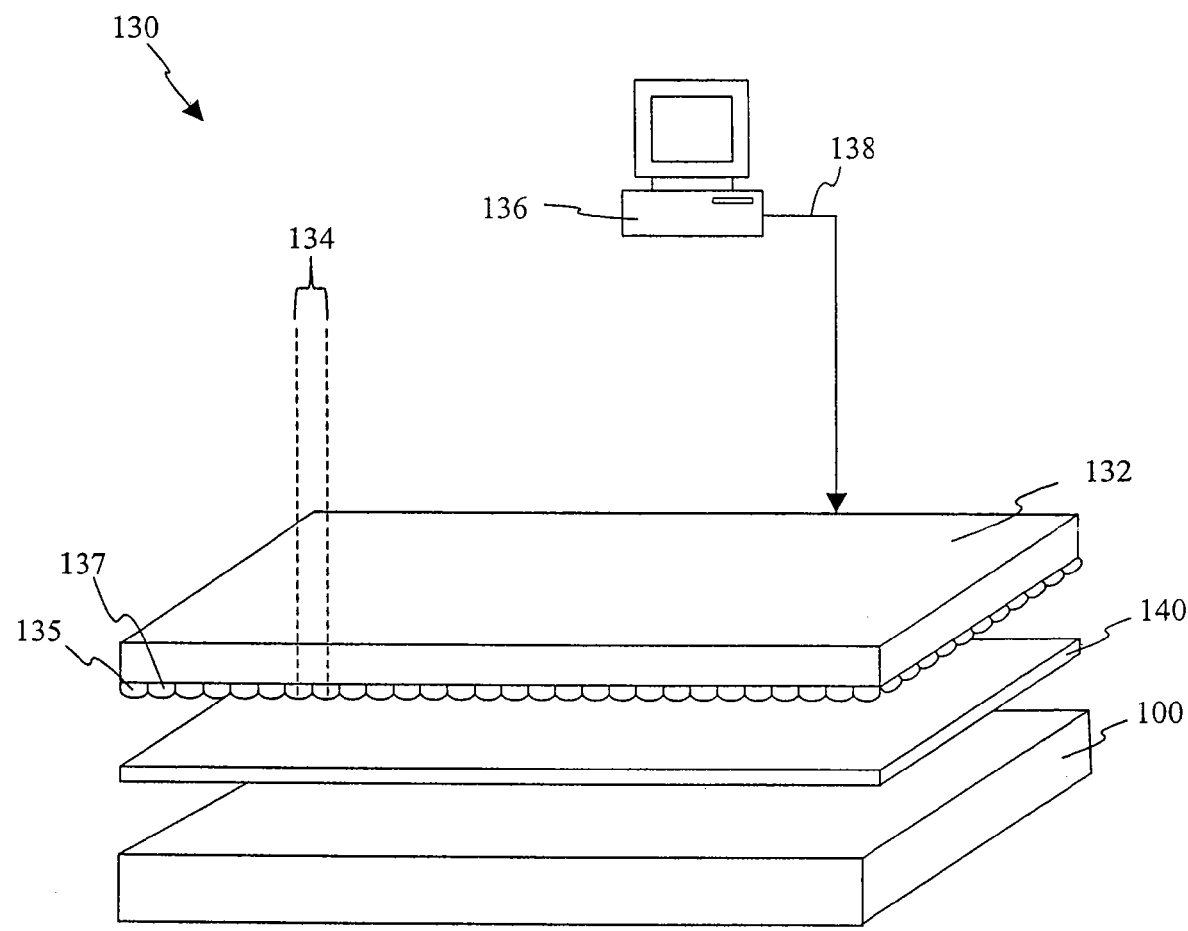
FIG. 4 is a diagram illustrating a system for manufacturing the wavefront aberrator, including a computer controlled light emitting diode (LED) array panel generating a curing pattern which is directed through a diffuser element onto a wavefront aberrator to selectively cure the radiation curable resin to create a particular, pre-determined refractive index profile.

Referring to FIG. 4, a diagram illustrating a system for manufacturing the wavefront aberrator is shown and generally designated 130. System 130 includes a light emitting diode (LED) array panel 132 having a number of diodes 135, 137, separated from adjacent diodes by a distance 134, and controlled by a computer 136 through interface 138. In a preferred embodiment, the distance 134 between diodes 135 and 137 varies, and may typically be approximately 0.125 inches (3.175 mm), though alternative distances may be used. A diffuser element 140 may be placed between LED array panel 132 and wavefront aberrator 100 to diffuse the light emitted by the LED array panel 132 to create a smoother refractive index profile.

In operation, once a desired refractive index profile is determined, computer 136 determines a particular pattern to be illuminated in the LED array panel 132 thereby generating a curing pattern which is directed through diffuser element 140 onto aberrator 100. By selectively illuminating particular LEDs 135 and 137, for example, within the LED array panel 132, the radiation curable resin (not shown this Figure) is selectively cured. This selective curing creates a predetermined, particular refractive index profile corresponding to the time of exposure of the radiation curable resin as well as the intensity of the exposure. This selective curing results in an aberrator with areas having different indices of refraction. Thus, by varying the intensity and period of illumination of LEDs 135 and 137, for example, the aberrator may be formed to exhibit the desired refractive index profile. For embodiments in which a liquid crystal polymer is used as the radiation curable resin, the LED array provides sufficient heat to mobilize the mesogenic units, which are subsequently aligned by applying an electromagnetic field of pre-determined magnitude (not shown).

Figure 5:
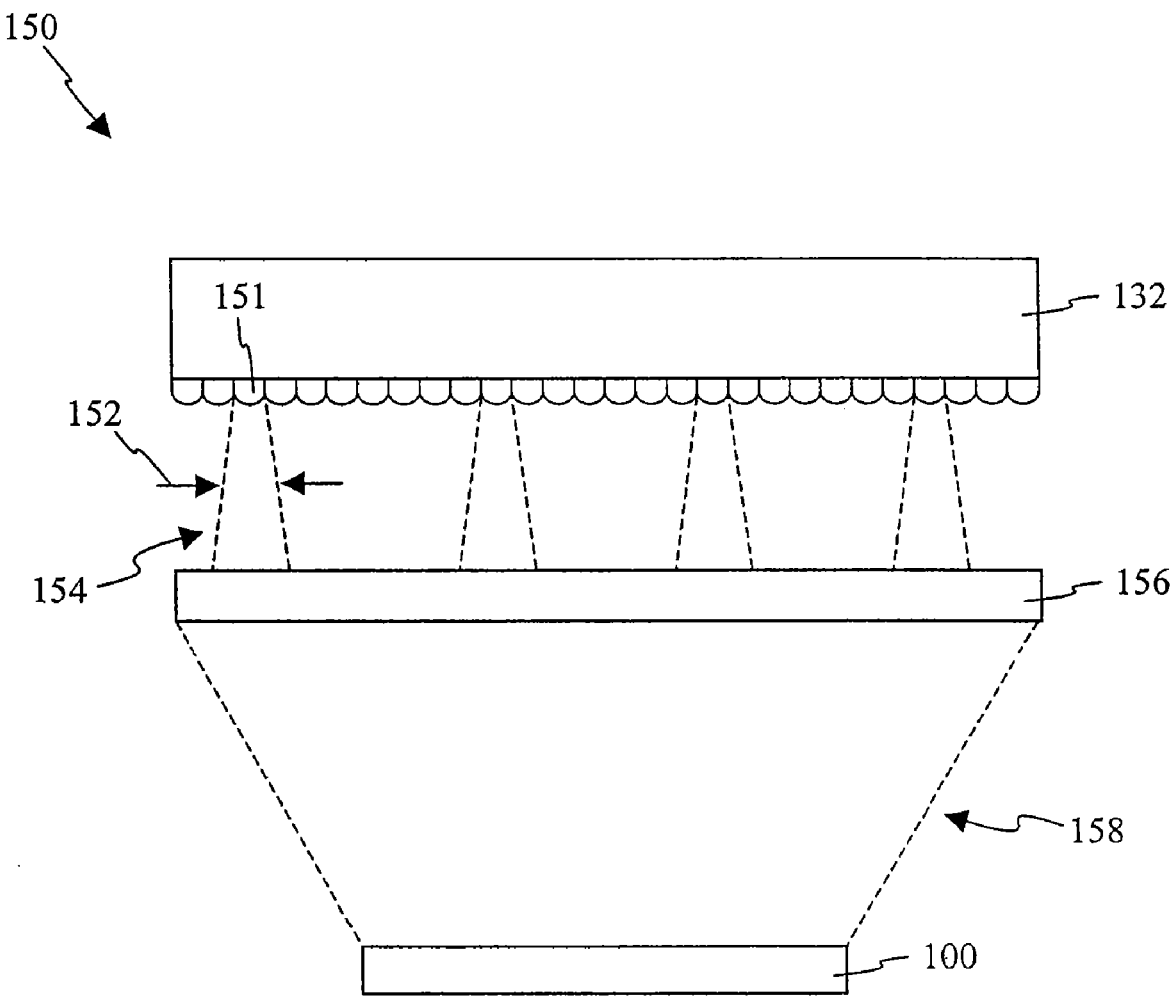
FIG. 5 is a diagram illustrating a system for manufacturing the wavefront aberrator, including an LED array panel generating a curing pattern which is directed through a demagnifier element and onto a wavefront aberrator to cure the radiation curable resin to create a particular refractive index profile.

Referring now to FIG. 5, an diagram illustrating a system for manufacturing the wavefront aberrator 100 is shown in a side view and generally designated 150. System 150 includes an LED array panel 132 where each LED 151 generates a light beam 154 having an diverging angle 152, and the LEDS collectively generate a curing pattern which is directed through a demagnifier imaging element 156 which focusses the curing pattern into light pattern 158 and onto a wavefront aberrator 100 to cure the radiation curable resin (not shown this Figure) within the aberrator 100 to create a particular wavefront profile as shown in FIG. 2. Alternatively, the curing pattern can be magnified, instead of demagnified, to produce a larger area aberrator device.

Figure 6:
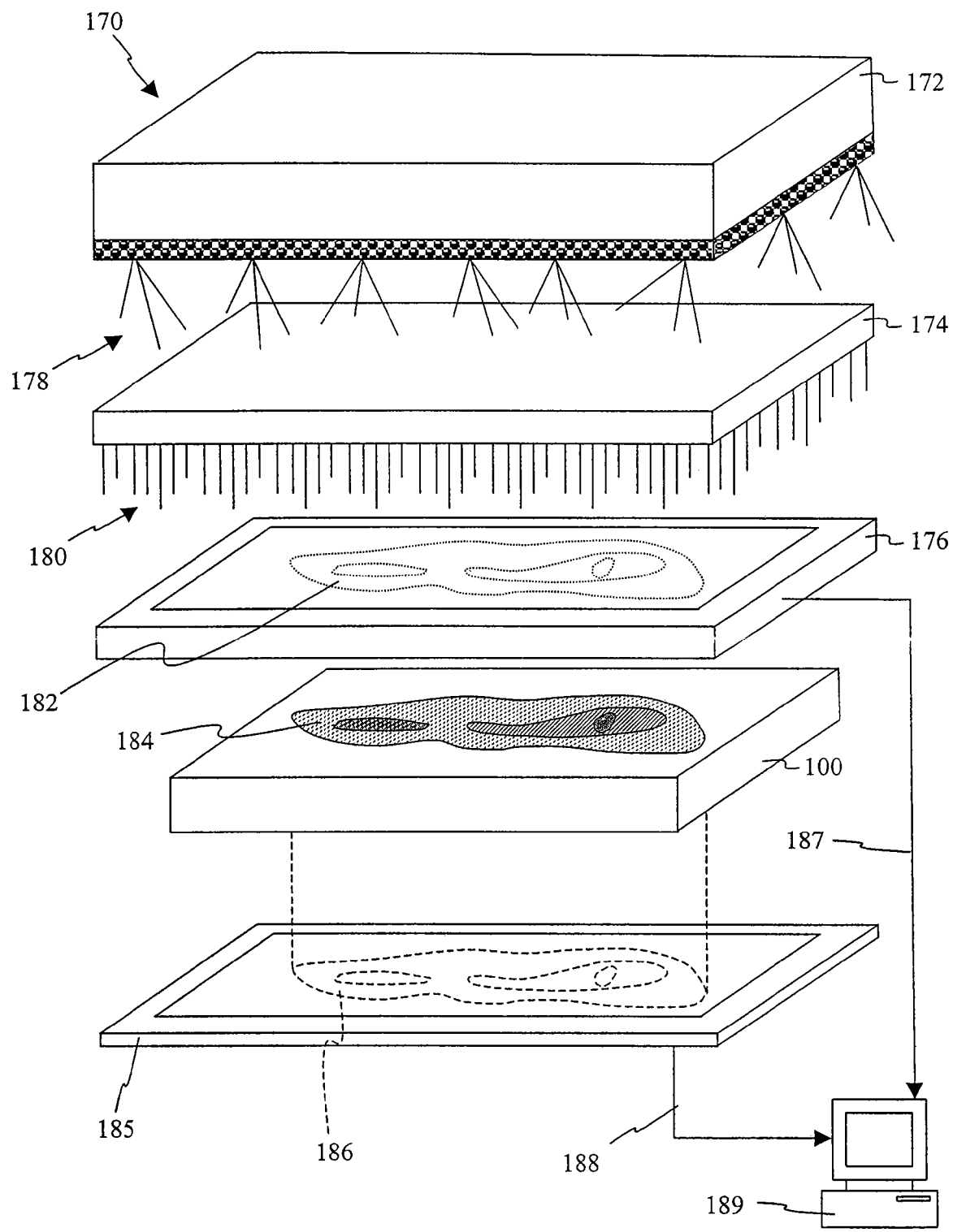
FIG. 6 is a diagram illustrating a system for manufacturing the wavefront aberrator, including a computer controlled liquid crystal display (LCD) generating a curing pattern such that when the LCD is exposed to light, light corresponding to the curing pattern is transmitted through the LCD and onto the wavefront aberrator to create a particular refractive index profile.

FIG. 6 is a diagram illustrating a system for manufacturing the wavefront aberrator 100 and is generally designated 170. System 170 includes a light source 172 adjacent a diffuser 174 which smoothes the light beams 178 and creates uniform intensity light rays 180. Light rays 180 pass through a computer controlled LCD 176 which acts as a spatial light intensity modulator and generates a curing pattern 182 such that when the LCD is exposed to light rays 180 from light source 172, light corresponding to the curing pattern 182 is transmitted through the LCD 176 and onto the wavefront aberrator 100 to create a particular refractive index profile 184.

In a preferred embodiment, light source 172 of system 170 is a constant fluence light having a constant intensity across the illuminated surface of the light. For example, light source 172 may contain an array of LEDs, or any other suitable source of illumination. The optical transmissive properties of the LCD can be controlled by applying a variable electrical voltage to an array of electrodes on an LCD device. This provides for the spatial and temporal variation of the intensity of light transmitted through the LCD device to selectively cure the resin 104 in the aberrator 100. For embodiments in which a liquid crystal polymer is used as the radiation curable resin, the constant fluence light source provides sufficient heat to mobilize the mesogenic units, which are subsequently aligned by applying an electromagnetic field of pre-determined magnitude (not shown).

As an addition to system 170, a detector 185 may be placed beneath aberrator 100 to detect the transmitted image 186 through aberrator 100. A feedback interface 188 may connect detector 185 to computer 189, which may in turn control LCD panel 176. In this manner, a refractive index profile may be determined in the computer 189, implemented in the LCD 176, and verified by detector 185, thereby ensuring the appropriate wavefront profile was created in aberrator 100. Detector 185 may comprise an intensity imager, such as a CCD, or a wavefront sensor, such as a Shack-Hartmann sensor, or any other optical sensor known in the art. A preferred wavefront sensor is disclosed in U.S. application Ser. No. 10/014,037, which is hereby incorporated by reference in its entirety.

Although panel 176 is discussed above as a LCD panel, an alternative embodiment could incorporate a photographic negative or positive that may be used to form the refractive index profile 184 in aberrator 100. In this manner, light source 172 would present a constant source of illumination, and the photographic negative or positive containing the refractive index profile 182 would control the spatial and intensity level of illumination reaching aberrator 100 to create the proper refractive index profile 184.

Figure 7A:
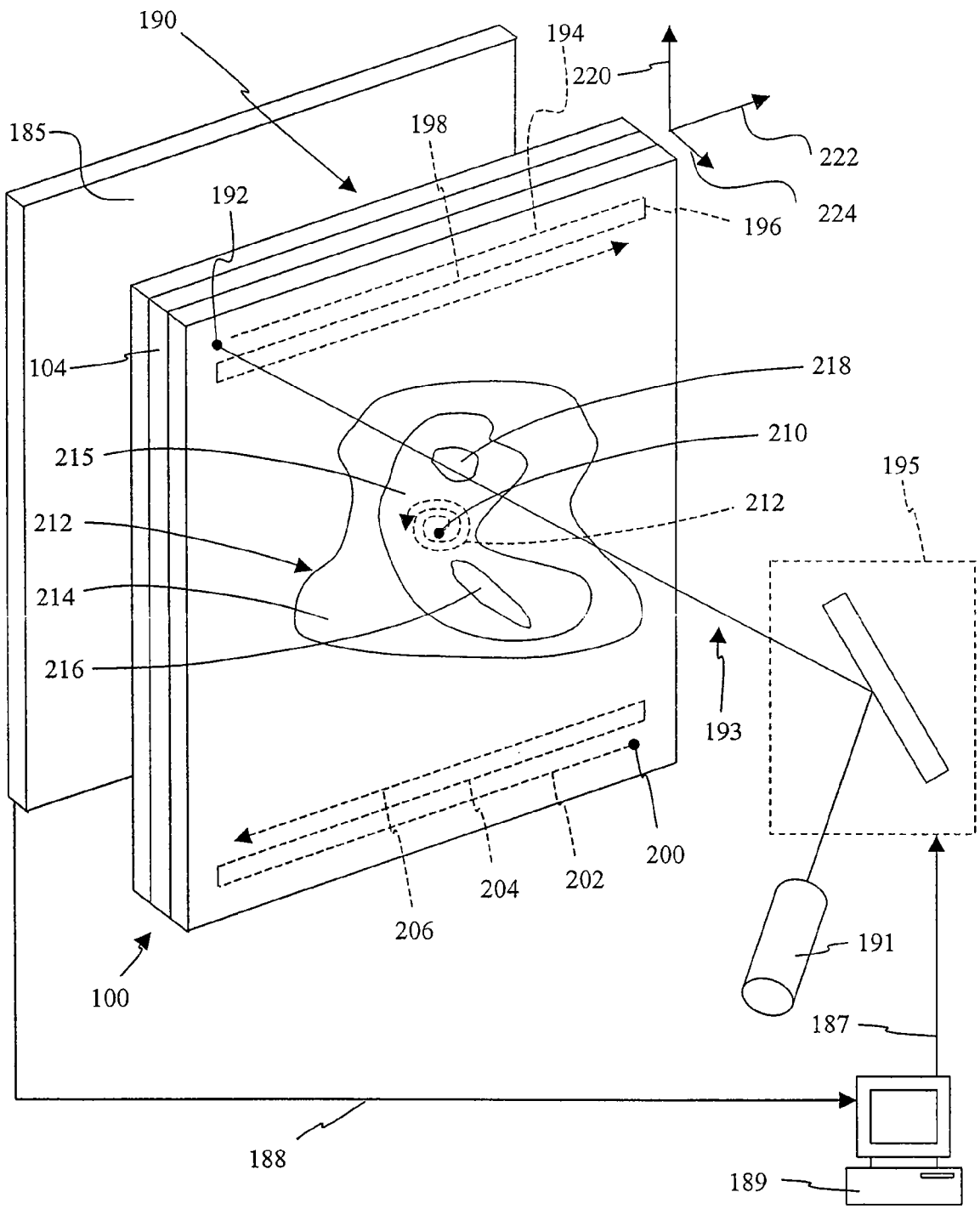
FIG. 7A is a diagram illustrating a system for manufacturing the wavefront aberrator, including a point light source that is moved across the surface of the wavefront aberrator at varying speeds and with varying intensities to selectively cure the radiation curable resin to create a particular refractive index profile or arrangement of sub-regions.

Referring now to FIG. 7A, a diagram illustrating an alternative system for manufacturing the wavefront aberrator 100 is shown and generally designated 190. System 190 includes a beam scan unit 195 having a laser unit 191 generating a laser beam 193 which forms a point light source ("spot") 192 on aberrator 100 which may include a laser intensity control (not shown). Spot 192 is moved across the surface of the aberrator 100 in a rastering path shown by dashed lines 194, 196, and 198, at varying speeds and with varying intensities to selectively cure the radiation curable resin 104 to create a particular refractive index profile 212 having areas 214, 215, and 216, with different indices of refraction. For embodiments in which a liquid crystal polymer is used as the radiation curable resin, the laser provides sufficient heat to mobilize the mesogenic units, which are subsequently aligned by applying an electromagnetic field of pre-determined magnitude (not shown).

Alternatively, a spot 200 may be formed and moved across aberrator 100 in paths 202, 204 and 206. Yet another alternative method of forming refractive index profile 212 includes the formation of spot 210 in the center of aberrator 100, and movement of the spot along an outwardly spiraling path 212. Also, a particular refractive index profile 212 may be traced, or circumscribed in a predetermined area, by laser beam 193 directly forming the boundaries between the areas 214, 215, and 216, for example. In an alternative embodiment, laser beam 193 may remain stationary and the aberrator device 100 may be moved relative to the laser beam 193 such that the spot 210 moves across the surface of the aberrator. Specifically, aberrator 100 may be moved in directions 220 and/or 222 to move the spot 210 across the surface of the aberrator.

As an addition to system 190, a detector 185 may be placed beneath aberrator 100 to detect the transmitted spot 192 through aberrator 100. A feedback interface 188 may connect detector 185 to computer 189, which may in turn control the beam scan unit 195 and/or laser unit 191. In this manner, a refractive index profile may be determined in the computer 189, implemented by the beam scan unit 195 and laser unit 191, and verified by detector 185, thereby ensuring the appropriate wavefront profile was created in aberrator 100. Detector 185 may comprise an intensity imager, such as a CCD, or a wavefront sensor, such as a Shack-Hartmann sensor, or any other optical sensor known in the art.

Figure 7B:
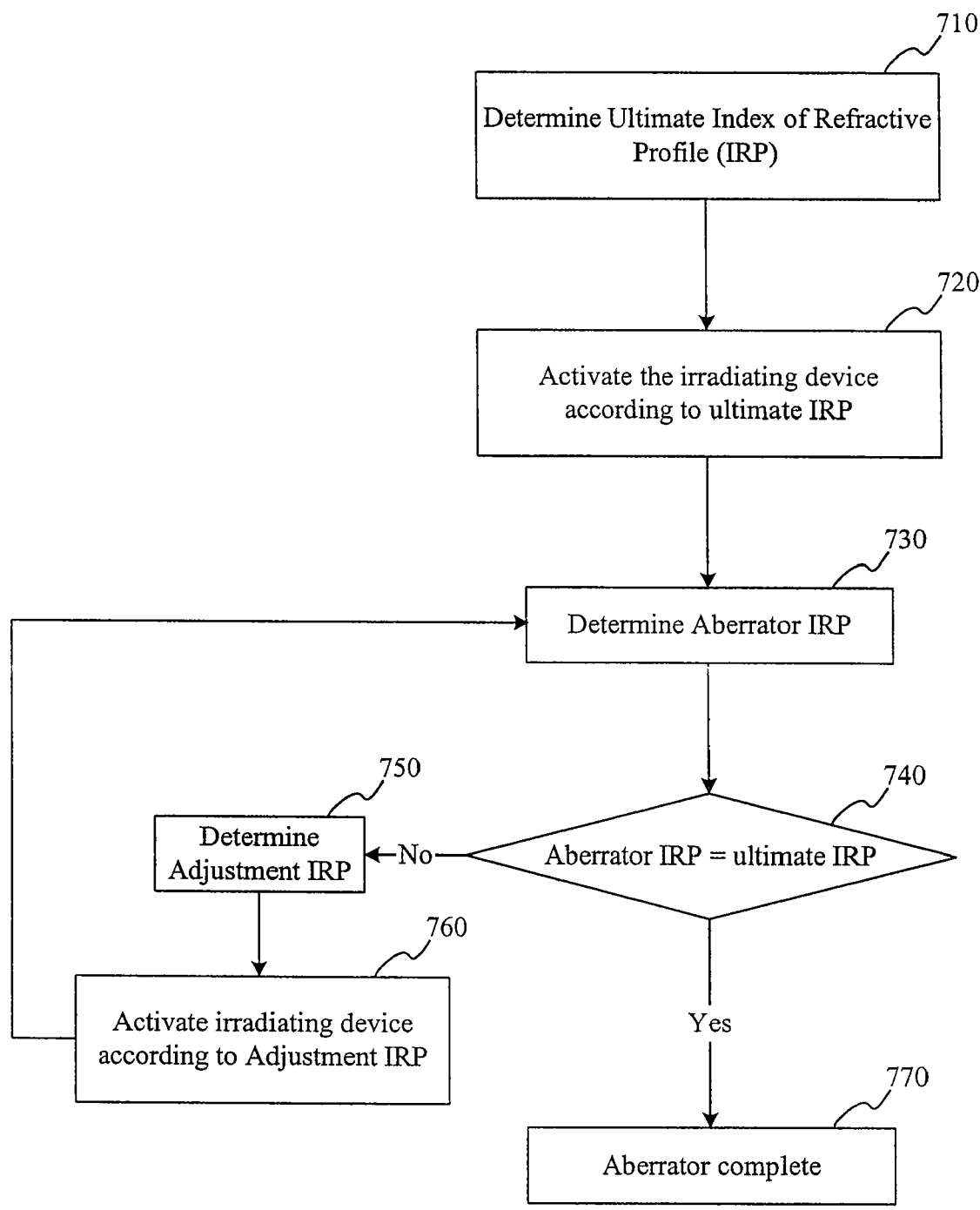
FIG. 7B is a flow chart illustrating a method of measuring a refractive index profile of the wavefront aberrator and providing feedback to the beam scan and laser unit according to the measure refractive index profile.

FIG. 7B is a flow chart illustrating a method of measuring a refractive index profile (the term "refractive index profile" is herein synonymous with "index of refraction profile" and "IRP") of an aberrator and providing feedback to an irradiating device, e.g., a constant fluence light or laser beam, according to a measured index of refraction profile. The feedback method of FIG. 7B may be implemented with any system of manufacturing a aberrator. For example, the feedback method of FIG. 7B may be used when manufacturing a aberrator using a light source that passes through a selectively transmissive LCD device (e.g., FIG. 6) or a point light source that varies speed and intensity at particular regions of the wavefront aberrator in order to create the desired IRP (e.g., FIG. 7).

In block 710, an ultimate index of refraction profile ("IRP") is determined. In one embodiment, the ultimate IRP is determined from an examination of the eye for which the aberrator will be used for correction. The ultimate IRP comprises information regarding a refractive index of various regions of the aberrator.

In block 720, an irradiating device, such as a constant fluence light or laser beam, is activated according to the ultimate IRP. For example, in an embodiment using a constant fluence light to selectively cure the radiation curable resin, the light may pass through an LCD panel that is configured to be selectively light transmissive according to the ultimate IRP. Similarly, in an embodiment using a laser beam to cure the radiation curable resin, the speed and intensity of the laser on different regions of the radiation curable resin varies according to the ultimate IRP. However, any method of irradiating (curing) the radiation curable resin will have an inherent error factor, such that the actual IRP of the aberrator may not be the same as the ultimate IRP). As such, further adjustments may be necessary to the aberrator.

In block 730, the IRP of the wavefront aberrator is determined. In the embodiments of both FIGS. 6 and 7, a detector 185 placed next to the aberrator opposite the irradiating device measures the IRP of the aberrator. Thus, as the radiation curable resin is cured, the actual IRP of the aberrator may be measured.

In block 740, the aberrator RP (determined in block 730) is compared to the ultimate IRP (determined in block 710). As mentioned above, the objective of the irradiation of the radiation curable resin is to selectively change the IRP of regions of the aberrator so that the ultimate IRP is substantially equal to the aberrator IRP. As such, if the aberrator IRP is not substantially equal to the ultimate IRP, the method continues to blocks 750 and 760 where additional adjustments to the aberrator IRP are made.

In block 750, an adjustment RP to be applied to the aberrator is determined. In one embodiment, the adjustment IRP comprises the difference between the ultimate IRP and the aberrator IRP (determined in block 730). The objective of the adjustment IRP is to further cure the radiation curable material so that the aberrator IRP is substantially equal to the ultimate IRP.

In block 760, the irradiating device is activated according to the adjustment IRP. As such, portions of the radiation curable resin that require additional curing are further irradiated in order to achieve the ultimate IRP in the aberrator. After the aberrator has been further cured according to the adjustment IRP the process returns to block 730 which determines the aberrator IRP and block 740 which determines whether the aberrator IRP is substantially equal to the ultimate IRP. In this way, blocks 730, 740, 750, and 760 may be repeated a number of times until the aberrator IRP is substantially equal to the aberrator IRP.

In block 770, the aberrator is complete when the aberrator IRP is substantially equal to the ultimate IRP.

Alternative Embodiments

Figure 8:
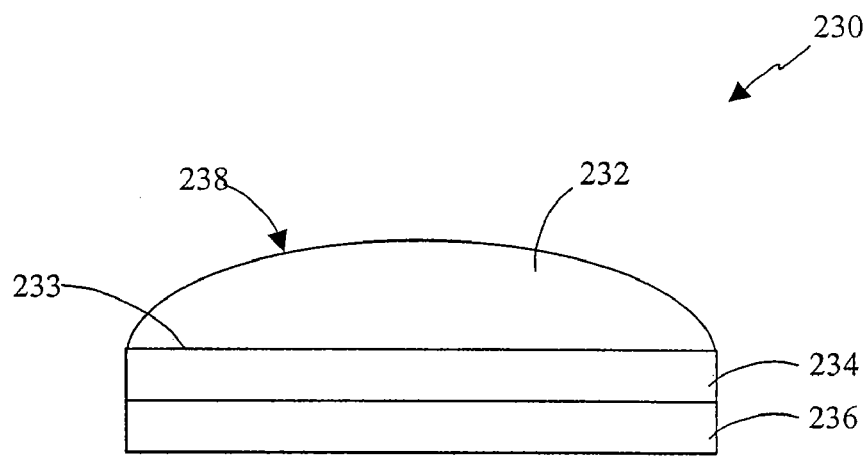
FIG. 8 is a diagram illustrating a side view of an alternative embodiment of the wavefront aberrator incorporating a transparent cover formed in the shape of a lens.

FIG. 8 is a diagram illustrating a side view of an alternative embodiment of the wavefront aberrator 100 incorporating a transparent cover 232 formed in the shape of a lens having a face 233 showing a lens with position focusing power. Alternatively, a lens with negative focusing power and with cylindrical (astigmatic) power may also be incorporated. Sandwiched between face 233 and a transparent cover 236 is a layer 234 of index-changing radiation curable resin. Transparent cover 232 has a spherical refractive surface 238 which functions as an optical element. Thus, the cover 232 in combination with radiation curable resin layer 234, provides for an optical element having both focusing and wavefront phase profile characteristics.

Figure 9:
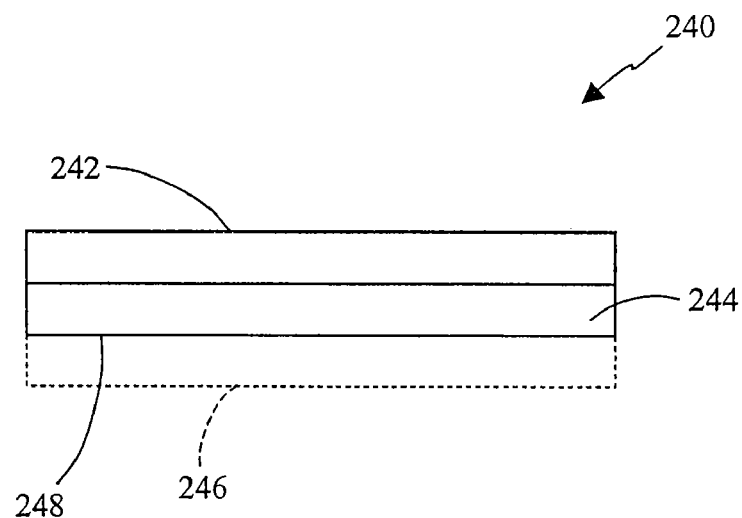
FIG. 9 is a diagram illustrating a side view of an alternative embodiment of the wavefront aberrator formed with a salt window as the lower transparent cover which, when dissolved, provides for an exposed radiation curable resin layer facilitating post-curing treatment of the radiation curable resin.

An alternative embodiment of the wavefront aberrator is shown in FIG. 9 and generally designated 240. Aberrator 240 includes an upper transparent window 242 and an adjacent layer 244 of index-changing radiation curable resin. A lower transparent window 246 (shown in dashed lines) is formed from a soluble salt. Once the refractive index profile has been formed in layer 244 of radiation curable resin, salt window 246 may be dissolved. The soluble nature of window 246 provides for an exposed radiation curable resin layer facilitating post-curing treatment of the radiation curable resin, if necessary. Alternatively, windows 242 and 246 may be made of organic materials which are soluble in organic solvents.

The embodiments discussed and suggested herein may be used to correct aberrations in virtually any optical system. For instance, the one embodiment may be particularly useful to correct inherent static aberrations in optical imaging systems, such as telescopes, binoculars, or microscopes. In addition, the concepts discussed herein may be applied to ophthalmic surgical or diagnostic systems, wherein the eye is a part of the system, such that improvement in the eye's aberration improves the way the system functions. For example, in an eye surgery, e.g., retinal surgery, the embodiments discussed herein may reduce or remove aberrations present in the eye such that better focusing of the laser may be achieved. Also, the concepts discussed herein may be advantageous when used in a fundus camera, slit lamp biomicroscope, opthalmoscope, or scanning laser opthalmoscopes, wherein the image quality may be improved by diminishing or removing aberrations in the optic system. Another embodiment may also be particularly useful by incorporating aberration corrections into eyepieces of optical systems such as telescopes, binoculars, or microscopes.

The aberrator of may also be used to correct static aberrations in laser beams or associated optics for use in laser ranging, detection, scanning, communication, or tracking instruments. This listing of uses for the various embodiments are merely exemplary, and are not intended to limit the scope of the invention whatsoever.

Additional Alternative Embodiments

Figure 10:
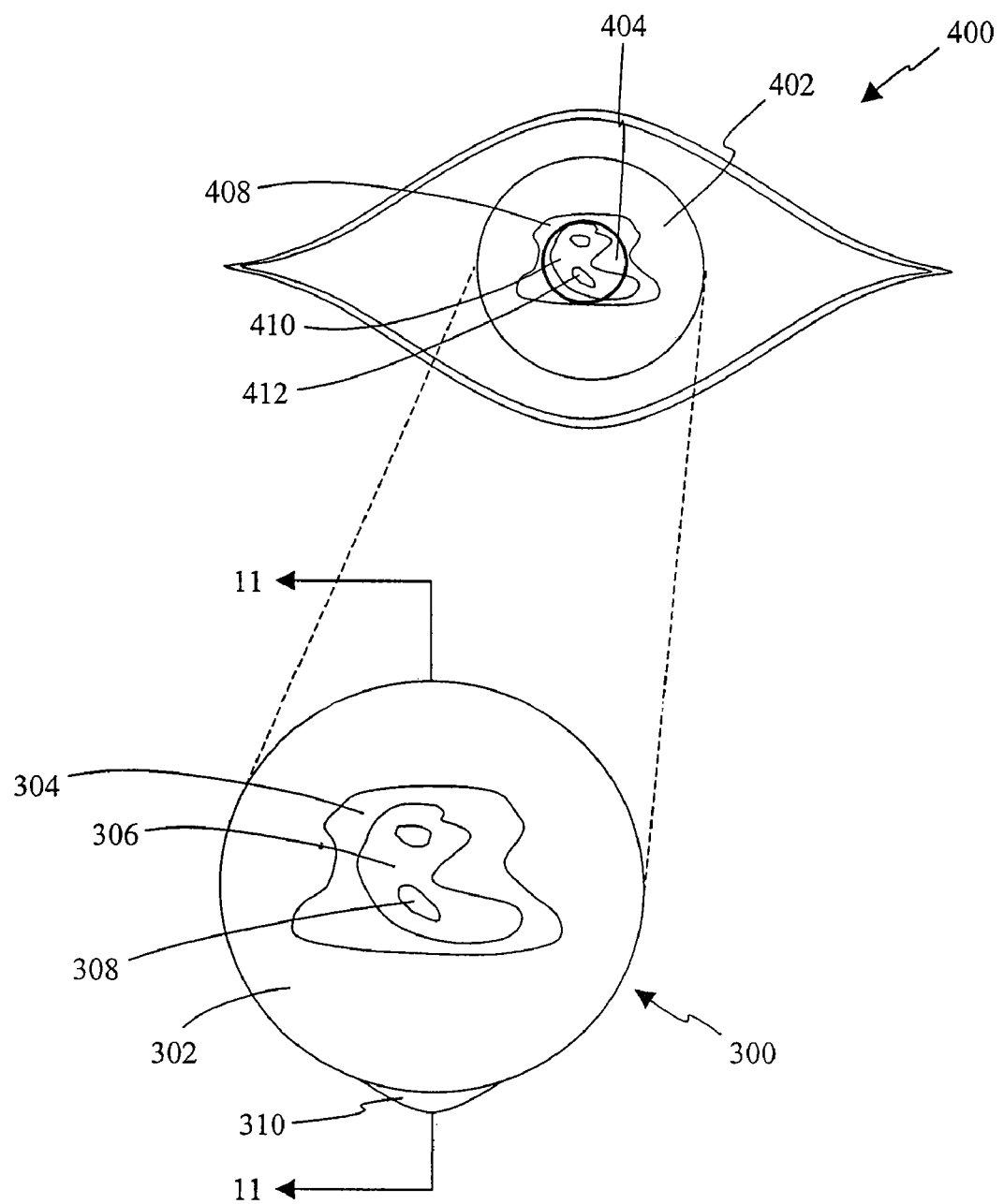
FIG. 10 is a diagram illustrating a perspective view of the Wavefront Aberrator utilized in the application of correcting optical aberrations of the human eye.

Referring now to FIG. 10, a diagram illustrating a perspective view of an alternative embodiment of the Wavefront Aberrator is shown and generally designated 300. Aberrator 300 allows for the correction of localized and non-uniform distortions of the human eye 400 and the manufacture of more complex prescriptions than traditional techniques. The human eye 400 is comprised of multiple components, including the cornea 402, the retina 404 and the lens 416 (shown in FIG. 13). Aberrator 300 is placed directly upon the anterior surface of cornea 402 of the eye 400.

Localized defects in the cornea 402 typically dominate the error sources that contribute to the degradation of visual acuity in the human eye 400. Examples of these localized defects are illustrated by several different regions 408, 410 and 412 possessing different radii of focus. As an image wavefront passes through cornea 402, the wavefront encounters localized defects 408, 410 and 412 and non-uniform distortion sources which causes the wavefront image to become non-coherently defocused thus causing degradation in a person's vision.

Figure 11:
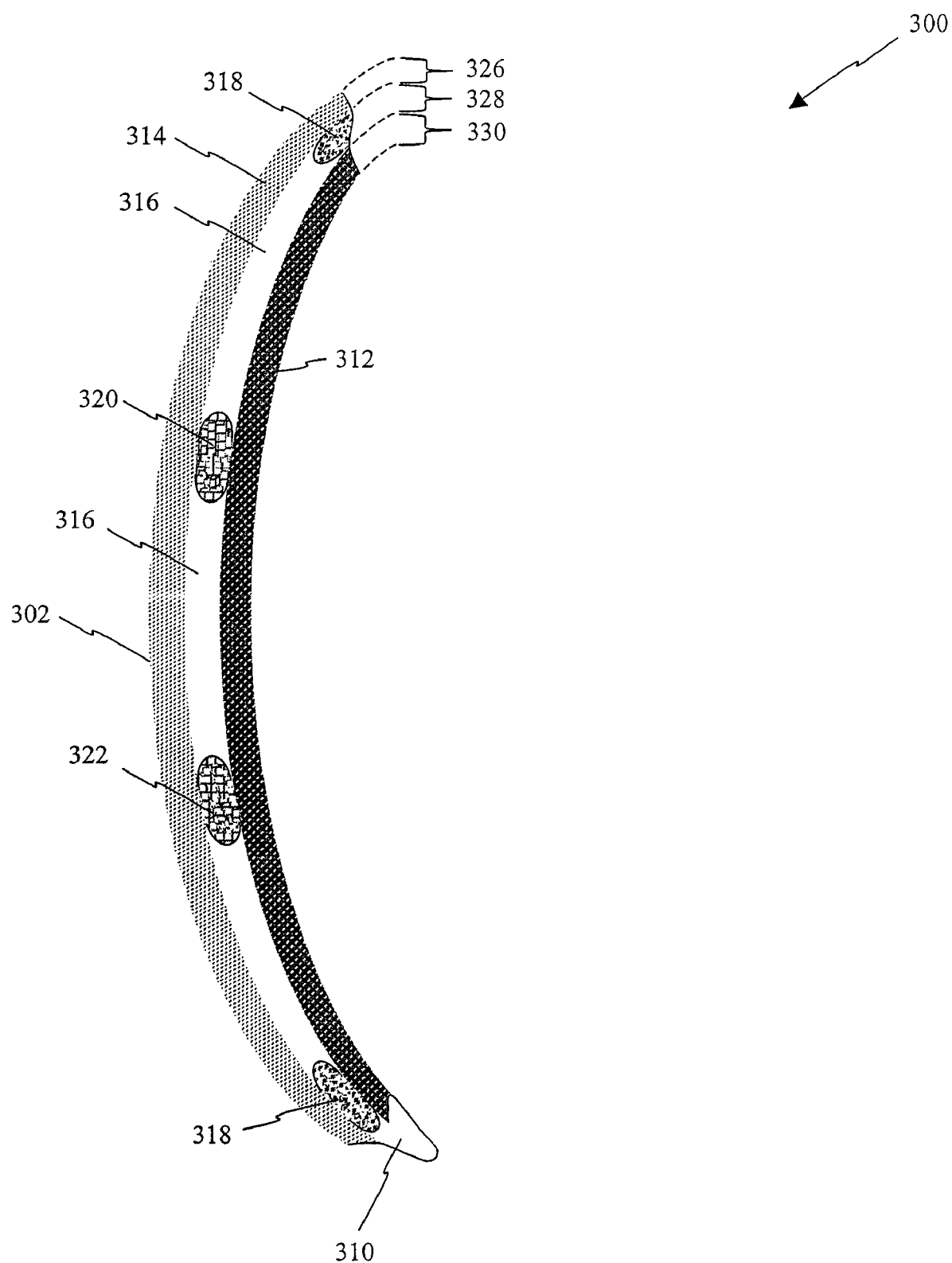
FIG. 11 is a diagram illustrating a cross-sectional view of the Wavefront Aberrator taken along the line 11-11 of FIG. 10, and showing the radiation curable resin layer between the upper and lower transparent covers.

With reference to FIGS. 10 and 11, aberrator 300 includes a body 302 which has an inner lens 312, an outer lens 314, and a radiation curable resin layer 316 sandwiched between inner lens 312 and outer lens 314. Also, as shown in FIG. 10, formed in radiation curable resin layer 316 are a number of refractive index profiles designated 304, 306, and 308. Importantly, these profiles 304, 306, and 308 are positioned to correspond to defects 408, 410 and 412 in the eye 400. As will be discussed below, the identification of defects 408, 410 and 412 lends itself directly to the creation of a wavefront aberrator containing corresponding, canceling refractive index profiles 304, 306 and 308, such that when light passes through aberrator 300 and into eye 400, any defects in the cornea are exactly compensated for.

Referring now to FIG. 11, aberrator 300 is shown to include a barrier 318 which surrounds radiation curable resin layer 316 in order to retain it between outer lens 314 and inner lens 312. Also shown is a weighted appendage 310 which serves to orient the lens properly on the cornea due to the gravitational force on appendage 310. People skilled in the art will also recognize that other method for ensuring the orientation of the lens on the cornea, such as by proper shaping of the lens, may be equally effective in certain embodiments.

Regions 320 and 322 are shown to depict areas where radiation curable resin layer 316 has been cured to create the refractive index profile necessary to compensate for the defects 408, 410 and 412 in the eye 400.

While FIGS. 10 and 11 depict a number of refractive index profiles, it is to be appreciated that the incorporation of these different regions of correction is merely exemplary, and alternative embodiments incorporating any number of regions of correction are contemplated. Furthermore, it should be appreciated that this illustration references defects in the cornea. However, it is contemplated that aberrator 300 may be utilized to compensate for any and all aberrations that contribute to the degradation of the human vision system, including but not limited to the error components (aberrations) contributed by the various components of the eye 400, including cornea 402, lens 416, and retina 404.

In use, aberrator 300 is placed directly upon the anterior surface of the cornea 402 of eye 400. As the wavefront enters the corrected human vision system, the wavefront traverses aberrator 300. Aberrator 300 creates a translated wavefront. The translated wavefront is designed to be 180 degrees out of phase with the impulse response of the uncorrected human vision system. When the wavefront translated by aberrator 300 passes through the uncorrected human vision system, the perceived wavefront is identical to the wavefront impinging upon the outer surface of the corrected human vision system, and thus visual acuity is improved.

Aberrator 300 is shown in FIG. 11 having meniscus lenses 312 and 314. It is to be appreciated that one or both of these lenses may be formed with a refractive characteristic, thereby providing an overall correction to the eye. Alternatively, lenses 312 and 314 may be formed to have little or no refractive qualities, providing for the entire optical correction to be realized within the radiation curable resin layer 316.

FIG. 11 illustrates the relationship between the inner transparent lens 312, the radiation curable resin layer 316, the outer transparent lens 314 and the radiation curable resin barrier 318. The enclosed volume of radiation curable resin layer 316 is determined by the volume enclosed by the radiation curable resin barrier 318, the inner transparent lens 312, and the outer transparent lens 314.

In a preferred embodiment, inner transparent lens 312 can be formed from a gas-permeable flexible or soft lens material, such as a transparent polymer, to increase patient comfort. The outer lens 314 can be made of a rigid gas permeable material to provide structural rigidity of the combined lens. Alternatively, both the inner and outer lenses 312, 314 can be made of rigid or soft lens material. The typical thickness of the outer, inner and cured resin material, i.e., the entire contact lens, ranges from about 0.03 to 0.5 mm. Exemplary thickness of the lenses 312, 314 are as follows: inner transparent lens 314 has a thickness 326 of approximately 0.005 inches (0.125 mm); radiation curable resin layer 316 has a thickness 328 of approximately 0.005 inches (0.125 mm); and outer transparent lens 312 has a thickness 330 of approximately 0.005 inches (0.125 mm).

Figure 12:
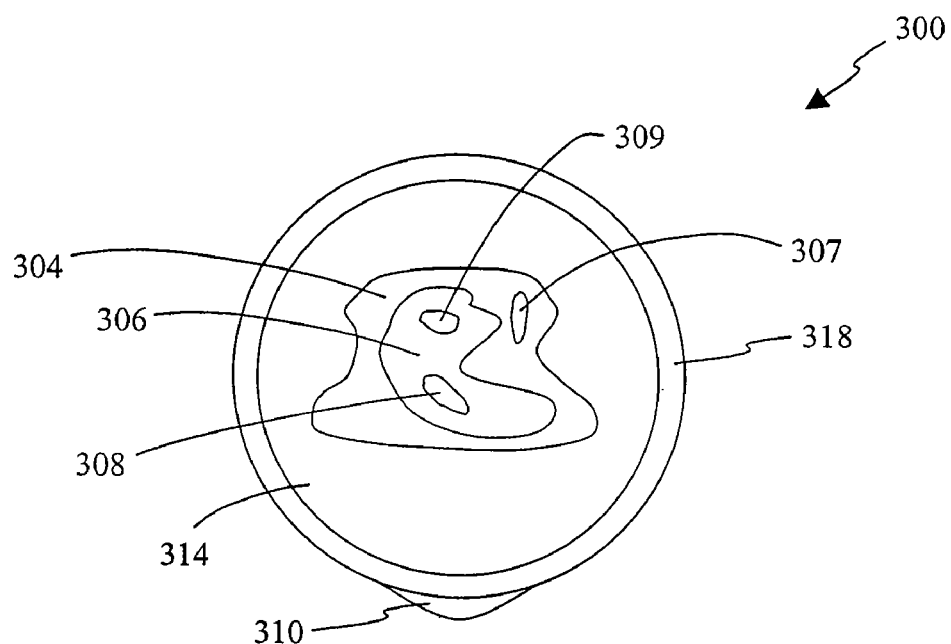
FIG. 12 is a diagram illustrating a frontal view of the Wavefront Aberrator, including a circular barrier confining a radiation curable resin layer within a predetermined volume, the radiation curable resin layer having a variety of refractive index profiles between different sub-regions.

Referring now to FIG. 12, a diagram illustrating a front view of the Wavefront Aberrator 300 is shown. A barrier, such as circular barrier 318, may be positioned surrounding the radiation curable resin layer 316 to retain the radiation curable resin between the inner and outer transparent lenses 312 and 314. Alternatively, lenses 312 and 314 may be fused together about their edges to seal radiation curable resin layer 316 between them, thereby providing for a thinner aberrator 300, facilitating the use of the aberrator on a human eye 400. The fusing together of lenses 312 and 314 about their edges, may be done by applying heat, by applying pressure, by applying radiation (e.g., a laser emission), by applying a chemical means such as a solvent or catalyst, or by a combination of any two or more of these methods.

In FIG. 12, a variety of refractive index profiles are shown to be formed in radiation curable resin layer 316. More specifically, different refractive index profiles are illustrated by regions 304, 306, 307, 308 and 309, such that aberrator 300 includes several distinct levels of refractive indices. It is also to be appreciated that the different profiles may be formed within radiation curable resin layer 316 to have virtually any shape or local curvature to accommodate virtually any defect in the eye 400.

Figure 13:
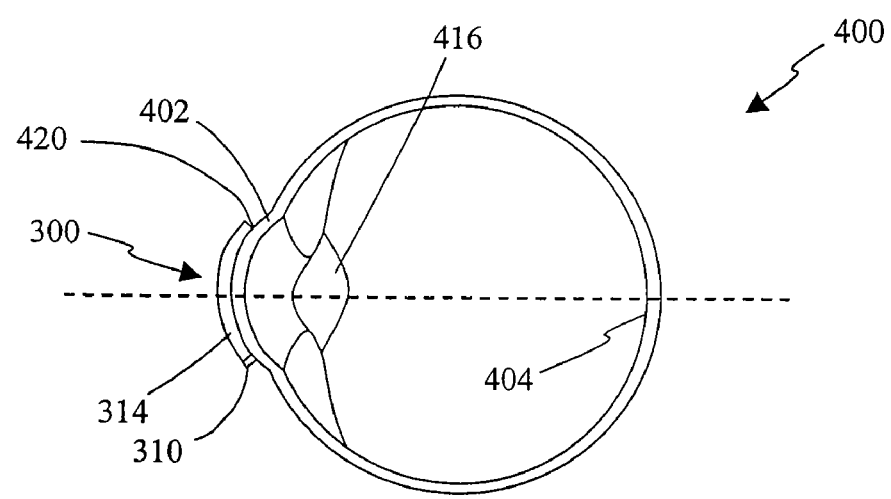
FIG. 13 is a diagram illustrating a cross-sectional view of the modified human vision system with the placement of the Wavefront Aberrator shown.

Referring now to FIG. 13, a cross-sectional view of the Wavefront Aberrator 300 properly placed on the human eye. Specifically, aberrator 300 rides on a thin film of aqueous fluid 420 on the outer surface of cornea 402. Once in place, aberrator 300 modifies the wavefront before in enters cornea 402 and passes through lens 416 to retina 404. Appendage 310 aids in maintaining aberrator 300 in proper rotational orientation with the optical axis to insure proper orientation of the modified wavefront with respect to the aberrations in the eye 400. The curvature of lenses 312 and 314 provides a centering force which maintains aberrator 300 in position on cornea 402.

Figure 14:
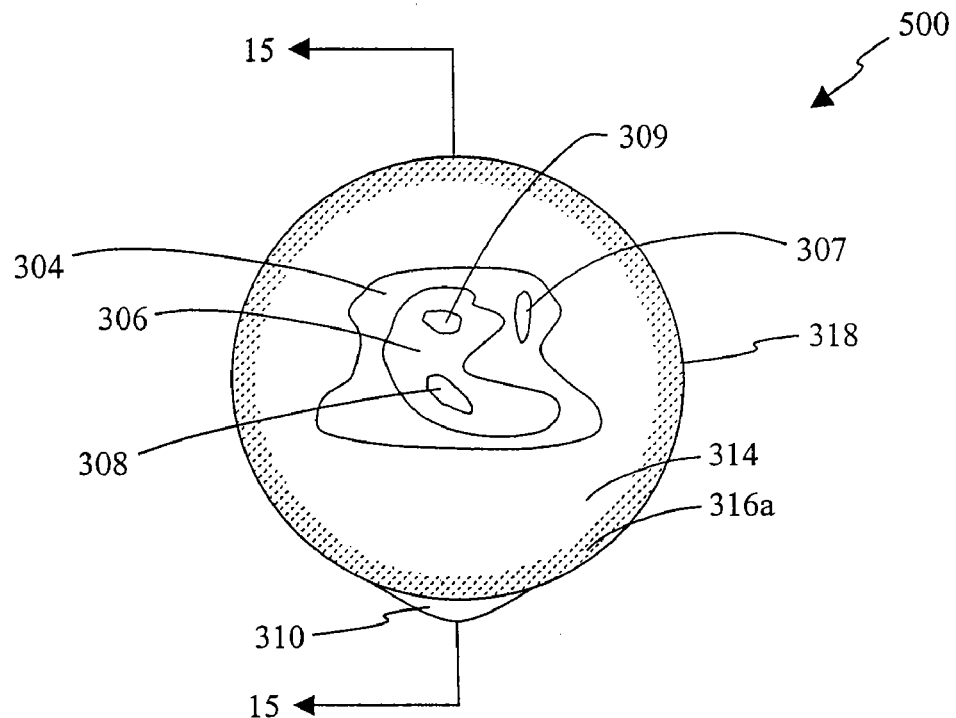
FIG. 14 is a diagram illustrating a frontal view of an alternative embodiment of the wavefront aberrator, including a cured radiation curable resin region confining a radiation curable resin layer within a predetermined volume, the radiation curable resin layer having a variety of refractive index profiles between different sub-regions.
Figure 15:
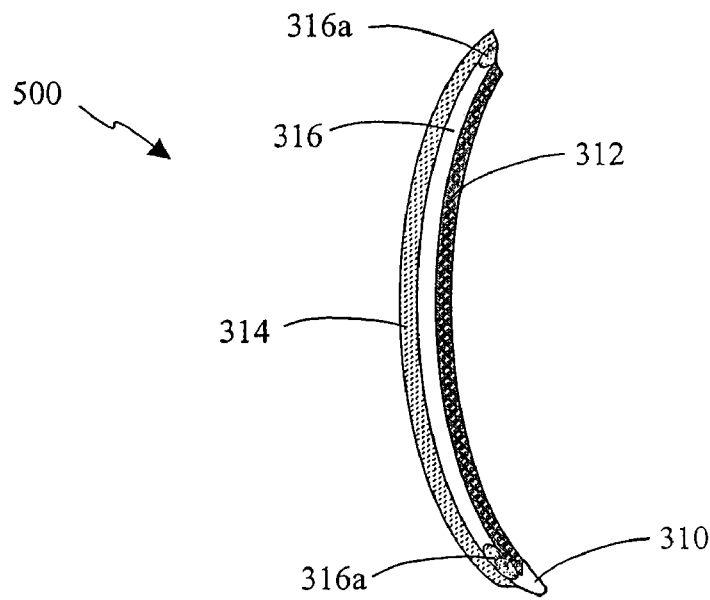
FIG. 15 is a diagram illustrating a cross-sectional view of an alternative embodiment of the wavefront aberrator, taken along the line 15-15 of FIG. 14, and showing the radiation curable resin layer sealed between inner and outer transparent covers.

FIGS. 14 and 15 are diagrams illustrating a front and cross-sectional views of an alternative embodiment, which is generally designated 500. Aberrator 500 is similar in many respects to the aberrator shown and described with respect to FIGS. 11-12. In particular, aberrator 500 comprises a radiation curable resin layer 316 between the inner and outer transparent lenses 312 and 314. However, in contrast to some of the other embodiments, aberrator 500 does not require a barrier layer (e.g., barrier 318) to retain the radiation curable resin layer 316.

For example, aberrator 500 is shown having a cured resin region 316a that is positioned near the perimeter of the aberrator. Because of the adhesive properties of particular light curable resins that may be utilized, the cured resin region 316a may function in a manner similarly to the barrier layer utilized by some of the other embodiments. In particular, the cured resin region 316a may be used to bond the inner and outer lenses 312 and 314, as well as for containing the radiation curable resin of the radiation curable resin layer 316.

Cured radiation curable resin region 316a is typically formed by curing a region of the existing layer of radiation curable resin 316 in an appropriate manner so that a seal is created between the inner and outer lenses 312 and 314. Curing techniques that may be used include heat, pressure, radiation, and the like.

Methods of Manufacturing the Aberrator for the Eye

The aberrator 300 shown in FIGS. 10 through 13 may be manufactured by any of several methods. In these methods, lenses 312 and 314 are dimensioned to be placed on an eye 400. In one method, the first step is that either the convex surface of inner lens 312, or the concave surface of outer lens 314, is coated with radiation curable resin to form radiation curable resin layer 316. Next, the other of the convex surface of inner lens 312 and the concave surface of outer lens 314, is placed on the exposed surface of radiation curable resin layer 316. Finally, radiation curable resin layer 316 is cured with light according to a desired refractive index profile.

In another method, radiation curable resin layer 316 is cured before the other of lens 312 and lens 314 is placed on radiation curable resin layer 316.

In yet another method, a barrier 318 is placed to surround radiation curable resin layer 318, in order to retain radiation curable resin layer 318 between lenses 312 and 314, either just before the radiation curable resin is placed on lens 312 or 314, or just before the other of lens 312 and lens 314 is placed on radiation curable resin layer 316.

In a fourth method, the edges of lenses 312 and 314 are fused together, in order to retain radiation curable resin layer 318 between lenses 312 and 314, just after the other of lens 312 and lens 314 is placed on radiation curable resin layer 316. The edges of lenses 312 and 314 may be fused together by heating them, by pressing them together, by irradiating them (e.g., with a laser emission), by applying a chemical means such as a solvent or catalyst to them, or by a combination of any two or more of these methods.

While there have been shown what are presently considered to be preferred embodiments of the present invention, it will be apparent to those skilled in the art that various changes and modifications can be made herein without departing from the scope and spirit of the invention. Specific parts, shapes, materials, functions and modules have been set forth, herein. However, a skilled technologist will realize that there are many ways to fabricate the system of the present invention, and that there are many parts, components, modules or functions that may be substituted for those listed above. While the above detailed description has shown, described, and pointed out the fundamental novel features of the invention as applied to various embodiments, it will be understood that various omissions and substitutions and changes in the form and details of the components illustrated may be made by those skilled in the art, without departing from the spirit or essential characteristics of the invention.

The invention claimed is:

1. A wavefront aberrator, comprising: a radiation curable resin layer comprising at least one area, each of said at least one area having a predetermined refractive index profile, said wavefront aberrator adapted to be placed on an eye, wherein the radiation curable resin layer comprising a liquid crystal polymer.

2. A wavefront aberrator as in claim 1, wherein: said eye has at least one defect, wherein said predetermined refractive index profile corrects said at least one defect.

3. A wavefront aberrator as in claim 2, wherein said at least one defect comprises a non-uniform distortion.

4. A wavefront aberrator as in claim 2, wherein each of said at least one defect corresponds to a location on said eye.

5. A wavefront aberrator as in claim 4, further comprising: a weighted appendage, whereby said wavefront aberrator is oriented on said eye such that each of said at least one area is adjacent said location on said eye corresponding to each of said at least one defect, respectively.

6. A method of manufacturing a wavefront aberrator comprising:
providing a radiation curable resin having a plurality of regions; curing each of said plurality of regions according to a desired refractive index for each of said plurality of regions; and packaging the resultant cured radiation curable resin for placement on a human eye, wherein the radiation curable resin comprising a liquid crystal polymer.

7. The method of claim 6, wherein said act of packaging comprises adhering said radiation curable resin between an outer lens and an inner lens, wherein said inner lens is configured to be placed on the outer surface of said human eye.

8. The method of claim 6, wherein said desired refractive index for said plurality of regions corresponds with a plurality of defects in said human eye.

9. The method of claim 6, wherein said radiation curable resin comprises an epoxy.

* * * * *